UNITED STATES PATENT OFFICE.

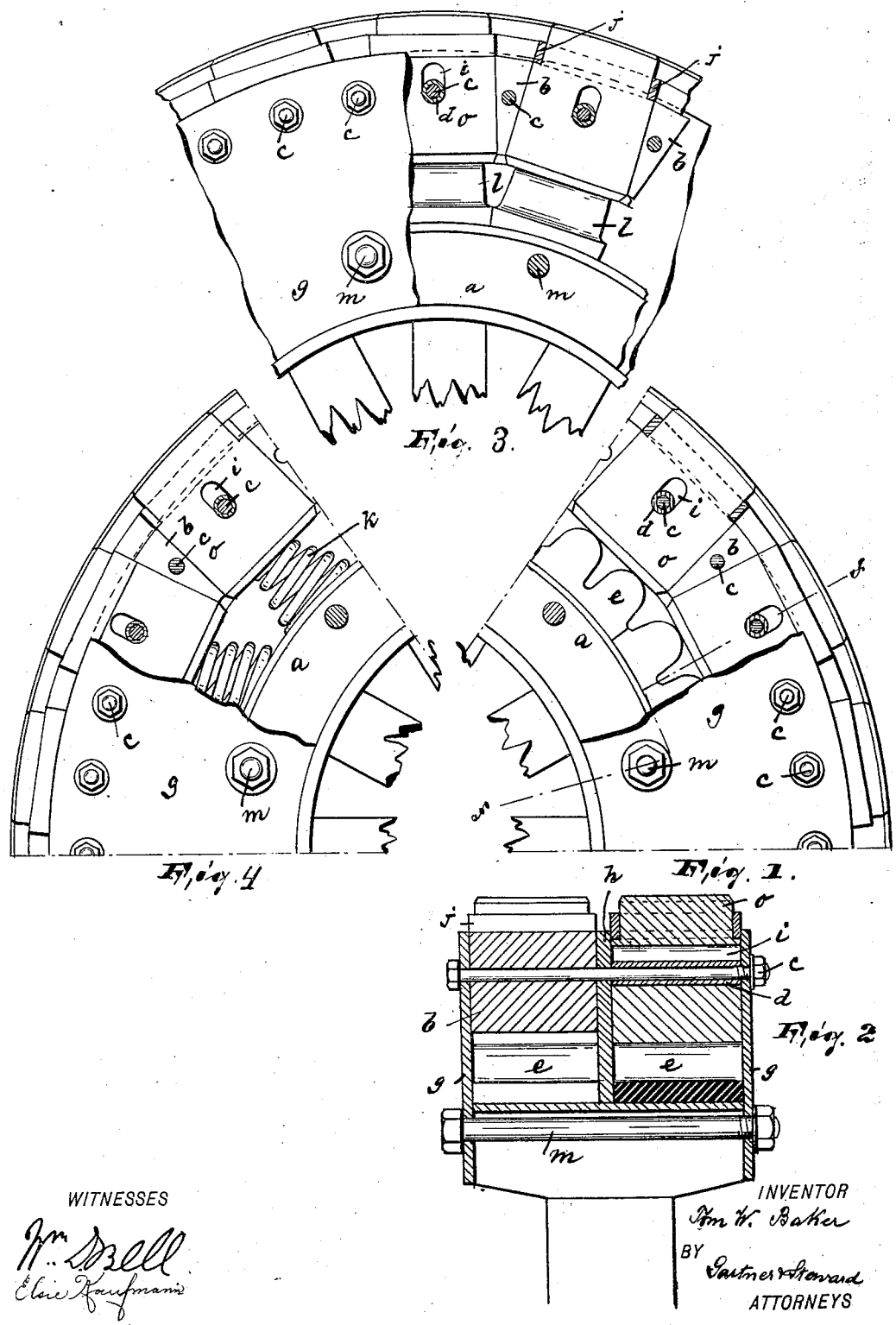

TOM WILLIAM BAKER, OF LONDON, ENGLAND.

VEHICLE-WHEEL.

969,241.  Specification of Letters Patent.  Patented Sept. 6, 1910.

Application filed May 2, 1907. Serial No. 371,385.

*To all whom it may concern:*

Be it known that I, TOM WILLIAM BAKER, a subject of the King of Great Britain, residing at London, England, have invented certain new and useful Improvements in and Relating to Vehicle-Wheels, of which the following is a specification.

This invention relates to vehicle wheels and more particularly to outer tires or tire treads therefor.

The object of my invention is to provide a wheel of the ordinary type with an outer tire or tread of suitable material, such as wood or rubber, of simple, strong and durable construction, easily attached to the ordinary wheel and preventing skidding upon asphalt or other smooth or slippery roads.

The invention consists in the improved outer tire combining a series of tread blocks and spacing pieces, the former being movable between the latter and controlled by elastic means, and in the means for securing said tread blocks, spacing pieces and elastic means to an ordinary wheel, substantially as will be hereinafter more fully described and finally embodied in the clauses of the claim.

Referring to the accompanying drawings in which like letters of reference indicating corresponding parts in each of the several figures: Figure 1 is a side elevation of a fragment of the tire or tread portion of the improved vehicle wheel, the near plate $g$ being removed and certain parts appearing in section. Fig. 2 is a sectional view on the line $f$—$f$ of Fig. 1; Figs. 3 and 4 are views similar to Fig. 1, illustrating slight modification of the elastic means for supporting the tread blocks.

In said drawing, $a$ represents the rim of an ordinary wheel of wood, steel or other material and $g$—$g$ are circular side plates or flanges secured to the rim of the wheel by means of bolts $m$ or in any desired manner. The said side plates $g$ project beyond the rim $a$, thus forming a channel, which is divided by the central flange $h$, as clearly shown in Fig. 2. In the channels thus formed are placed rubber blocks $e$ provided with transverse corrugations, as shown in Fig. 1, upon which bear the tread blocks $o$, made of wood (preferably rock-elm) or other hard material, which blocks project beyond the said plates $g$. The tread blocks $o$ are each provided with a radially arranged elongated slot $i$ penetrated by the bolts $c$, secured to the plates $g$—$g$, and are surrounded by tubes or ferrules $d$, acting as distance pieces.

The tread blocks $o$ are separated by wedged shaped transverse pieces or dividing blocks $b$, secured to the plates $g$ by corresponding bolts $c$, and forming guides for the tread blocks, when the latter are being depressed, moving on the bolts $c$ (penetrating the slot $i$) as will be manifest. It may be well to remark that the transverse pieces $b$ are shorter than the tread blocks $o$ and do not project to the outer periphery of the latter.

In some cases a bond or hoop of iron or steel $j$—$j$ is placed upon and around each of the tread blocks $o$, to keep them from being split on rough roads.

The elastic supporting means $e$, which in Fig. 1 are shown as being provided with transverse corrugations, can also be arranged as shown at $l$ in Fig. 3, that is to say said corrugations being concentric with the wheel proper, or coiled springs $k$ can be used instead as illustrated in Fig. 4. It will thus be seen that an elastic bed is formed to each tread block which is free to be depressed and to rebound.

What I claim is:

The combination, with a wheel rim, of side plates carried thereby, an intermediate flange arranged between the side plates and forming channels therewith, tread blocks arranged in said channels, the tread blocks in one channel breaking joints with those in the other, dividing blocks alternating with the tread blocks in each channel, bolts penetrating said side plates and the flange and each also penetrating a tread block in one channel and a dividing block in the other channel, each tread block having a radially arranged slot receiving the bolt, and a resilient bed for the tread blocks, substantially as described.

In testimony whereof I have hereunto set my hand in presence of two subscribing witnesses.

TOM WILLIAM BAKER.

Witnesses:
H. D. JUMESON,
F. L. RANDS.